(12) United States Patent
Ikeda et al.

(10) Patent No.: US 7,654,372 B2
(45) Date of Patent: Feb. 2, 2010

(54) SHOE-HOLD APPARATUS FOR DRUM BRAKE DEVICE

(75) Inventors: Takashi Ikeda, Oura-gun (JP); Yasunobu Sugii, Oura-gun (JP)

(73) Assignee: Nisshinbo Holdings, Inc., Tokyo (JP)

( * ) Notice: Subject to any disclaimer, the term of this patent is extended or adjusted under 35 U.S.C. 154(b) by 0 days.

(21) Appl. No.: 12/355,357

(22) Filed: Jan. 16, 2009

(65) Prior Publication Data

US 2009/0183960 A1 Jul. 23, 2009

(30) Foreign Application Priority Data

Jan. 17, 2008 (JP) .............................. 2008-007926

(51) Int. Cl.
F16D 51/00 (2006.01)
(52) U.S. Cl. ...................... 188/340; 188/234
(58) Field of Classification Search .................. 188/74, 188/78, 325–340
See application file for complete search history.

(56) References Cited

U.S. PATENT DOCUMENTS

| | | | | |
|---|---|---|---|---|
| 4,623,050 A | * | 11/1986 | Copp | 188/340 |
| 5,368,139 A | * | 11/1994 | Pirrallo et al. | 188/78 |
| 5,540,310 A | * | 7/1996 | Ludtke et al. | 188/340 |
| 6,062,354 A | * | 5/2000 | Pugh | 188/341 |
| 6,343,678 B1 | * | 2/2002 | Barbosa | 188/340 |

* cited by examiner

*Primary Examiner*—Christopher P Schwartz
(74) *Attorney, Agent, or Firm*—Apex Juris, pllc; Tracy M Heims (57) ABSTRACT

To accomplish both prevention of disengagement of the shoe-hold spring from the shoe-hold apparatus and improvement of the assemblability of the same. The shoe-hold pin has the small diameter portion and the large diameter portion. One end opened slots are formed at the pair of arms of the U-shaped shoe-hold spring, and the slots are such that the small diameter portion of the shoe-hold pin is passable therethrough and the large diameter portion is non-passable.

The pin-insertion hole, which is continuous to the slot of the web side arm and may position the large diameter portion therein, is formed in the web side arm and restricts the shoe-hold spring from disengaging therefrom when the large diameter portion of the shoe-hold pin is positioned in the pin-insertion hole.

2 Claims, 9 Drawing Sheets

SHOE-HOLD APPARATUS FOR DRUM BRAKE DEVICE

CROSS-REFERENCE TO RELATED APPLICATION(S) AND CLAIM OF PRIORITY

The present application claims the benefit under 35 U.S.C. section 119(a) of Japanese Patent Application filed in the Japan Patent Office on Jul. 4, 2007 and assigned serial number 2007-176029, the disclosure of which is incorporated herein by reference.

FIELD OF INVENTION

This invention relates to a shoe-hold apparatus for a drum brake device that slideably and resiliently holds a brake shoe on a back plate.

BACKGROUND OF THE INVENTION

A well-known shoe-hold apparatus is structured by comprising a shoe-hold spring, which is a sheet metal bent to form a web side arm and a drum side arm and has a pair of one end opened slots at ends of the arms, and a shoe-hold pin, which engages with the back plate.

This conventional shoe-hold apparatus is structured such that the shoe-hold spring is retained between a flattened engagement head of the shoe-hold pin and the web by next steps;
(1) the shoe-hold pin is penetrated through a pin-insertion hole formed in the back plate to engage the shoe-hold pin with the back plate,
(2) the shoe-hold spring is sled on a drum side surface of the web from a crossing direction with an axis of the shoe-hold pin so that the shoe-hold pin passes through the pair of slots.

Patent Reference 1 discloses the above-type shoe-hold apparatus. The shoe-hold apparatus described in the Patent Reference 1 is designed such that a concave seat is formed at a closed end portion of the slot, which is formed at each end of the pair of arms of the shoe-hold spring, and one of the concave seats is engaged with the engaging head of the shoe-hold pin in order to prevent a disengagement of the shoe-hold spring.

The shoe-hold apparatus is assembled by next steps:
(1) the shoe-hold pin is penetrated through the pin-insertion hole formed in the back plate to engage the shoe-hold pin with the back plate,
(2) the pair of arms of the shoe-hold spring are compressed and then the shoe-hold spring is pushed from a crossing direction with the axis of the shoe-hold pin along the web to move the shoe-hold sprig until the closed end portion of the slot of the shoe-hold spring reaches the shaft of the shoe-hold pin, and
(3) the force compressing the pair of arms is released to engage one of the concave seats with the engaging head of the shoe-hold pin.

Also, for another conventional shoe-hold apparatus, the Patent Reference 2 discloses the shoe-hold apparatus having the shoe-hold spring made of a sheet metal bent in P-shape to approach the web side arm to the drum side arm.

Patent Reference
[Patent Reference 1] U.S. Pat. No. 5,540,310 (FIGS. 1-3)
[Patent Reference 2] U.S. Pat. No. 6,062,354 (FIGS. 1-4)

The characteristics of the shoe-hold apparatus disclosed in the Patent Reference 1 are the concave seats, which are formed at the closed end portions of the pair of slots, and the bending portions, which are formed at the top ends of the pair of arms. The conventional shoe-hold apparatus has the following problems.

<1> An engagement portion, where the shoe-hold pin engages with the shoe-hold spring, is only one portion between the engagement head of the shoe-hold pin and one of the concave seats of the shoe-hold spring after assembly thereof, and no other engagement portions exist between the shoe-hold pin and the shoe-hold spring.

Therefore, if someone pulls the shoe-hold spring, for example, while the drum brake device is being carried (prior to the assembly of the drum brake device to the vehicle), the shoe-hold spring rotates with the engagement portion as the fulcrum, thereby creating a chance of disengaging the shoe-hold spring.

<2> In order to engage the engagement head of the shoe-hold pin with the seat of the shoe-hold spring, the shoe-hold spring needs to forcefully, resiliently be deformed equal to or more than the depth of the seat and to move the shoe-hold spring while maintaining the condition of resilient deformation to the end, thereby leaving a problem of extremely inefficient operability.

The shoe-hold apparatus described in the Patent Reference 2 has the following problems.
<1> In the shoe-hold apparatus in the Patent Reference 2, the distance between the pair of arms is set short, and therefore the invention in the Patent Reference 2 does not require bending portions at top ends of the pair of arms as like as required in the shoe-hold apparatus in the Patent reference 1.

However, the invention in the Patent Reference 2 has no concave seat as compared to the device of the Patent Reference 1, which facilitates the movement of the shoe-hold spring and creates a chance of disengaging the shoe-hold spring, and therefore the disengagement preventive effect of the shoe-hold spring after the assembly of the shoe-hold apparatus is not considered sufficient.

SUMMARY OF THE INVENTION

The present invention was made in consideration of the above-problems, and the object is to improve the assembleability of the shoe-hold apparatus with a simple structure and to certainly prevent the disengagement of the shoe-hold spring.

In order to achieve the above-objects, a shoe-hold apparatus for a drum brake device relating to the first invention of this application comprises: (1) a shoe-hold spring including a first arm or a web side arm arranged on a drum side surface of a web of a brake shoe, which is mounted on a back plate at an opposite side of the back plate, a second arm or a drum side arm arranged to face the first arm, and a curved connecting portion jointing the first and second arms, the first arm and the second arm have a one end opened first slot and a one end opened second slot at their ends respectively; and (2) a shoe-hold pin including a first head that is non-passable through a pin-insertion hole formed in the back plate, a shaft continuing from the first head and passable through the pin-insertion hole, and a second head continuing from the shaft and passable through the pin-insertion hole, the shoe-hold spring is resiliently retained between the second head and the web by penetrating the second head and shaft through the pin-insertion hole of the back plate to engage the first head with the back plate and sliding the shoe-hold spring on the drum side surface of the web from a crossing direction with an axis of the shoe-hold pin while the second head and a part of the shaft are projecting from the drum side surface of the web so that the shoe-hold pin can be passed through the pair of the first and second slots, wherein the shoe-hold spring has a pin-insertion portion continuing from the first slot in the first arm and the shaft of the shoe-hold pin has (1) a penetrating portion that is passable through the first and second slots and (2) a disengagement preventive portion that is non-passable through the first slot of the first arm and is configured so that a predetermined portion thereof is allowed to be positioned in the pin insertion portion, the disengagement preventive portion has a length that is projected from the drum side surface of the web mounted on the back plate while the shoe-hold pin is engaging with the back plate; and the length that is projected from the drum side surface of the web is determined so as to restrict a lateral movement of the shoe-hold spring along the web and a rotational movement of the shoe-hold spring with said second head as fulcrum when the disengagement preventive portion of the shoe-hold pin is positioned within the pin-insertion portion of the first arm.

According to this invention, disengagement of the shoe-hold spring can surely be prevented even after assembling the shoe-hold spring.

The shoe-hold apparatus relating to the second invention of this application is such that the shoe-hold pin is such that the first arm of the shoe-hold spring is temporarily mountable on a border between the penetrating portion and the disengagement preventive portion.

According to this invention, assembleability of the shoe-hold spring is improved.

According to the present invention, there is a dimensional difference between the width of the one end opened slot formed in the first arm of the shoe-hold spring and the disengagement preventive portion of the shoe-hold pin, therefore the disengagement preventive portion is unable to pass through the slot formed in the first arm of the shoe-hold spring, thereby certainly preventing the disengagement of the shoe-hold spring.

Furthermore, because the shoe-hold spring can temporarily mount on the shoe-hold pin, only the shoe-hold spring needs to be moved after the temporarily mounting, and in other words no force is necessary so as to keep the resilient deformation of the shoe-hold spring, thereby significantly improving the assembleability of the shoe-hold apparatus.

Also, because the shape and structure of the shoe-hold pin is simple, manufacturing of the shoe-hold pin is simple.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

The shoe-hold apparatus of the drum brake device relating to the present invention will be explained next.

First Embodiment

Figure 1:
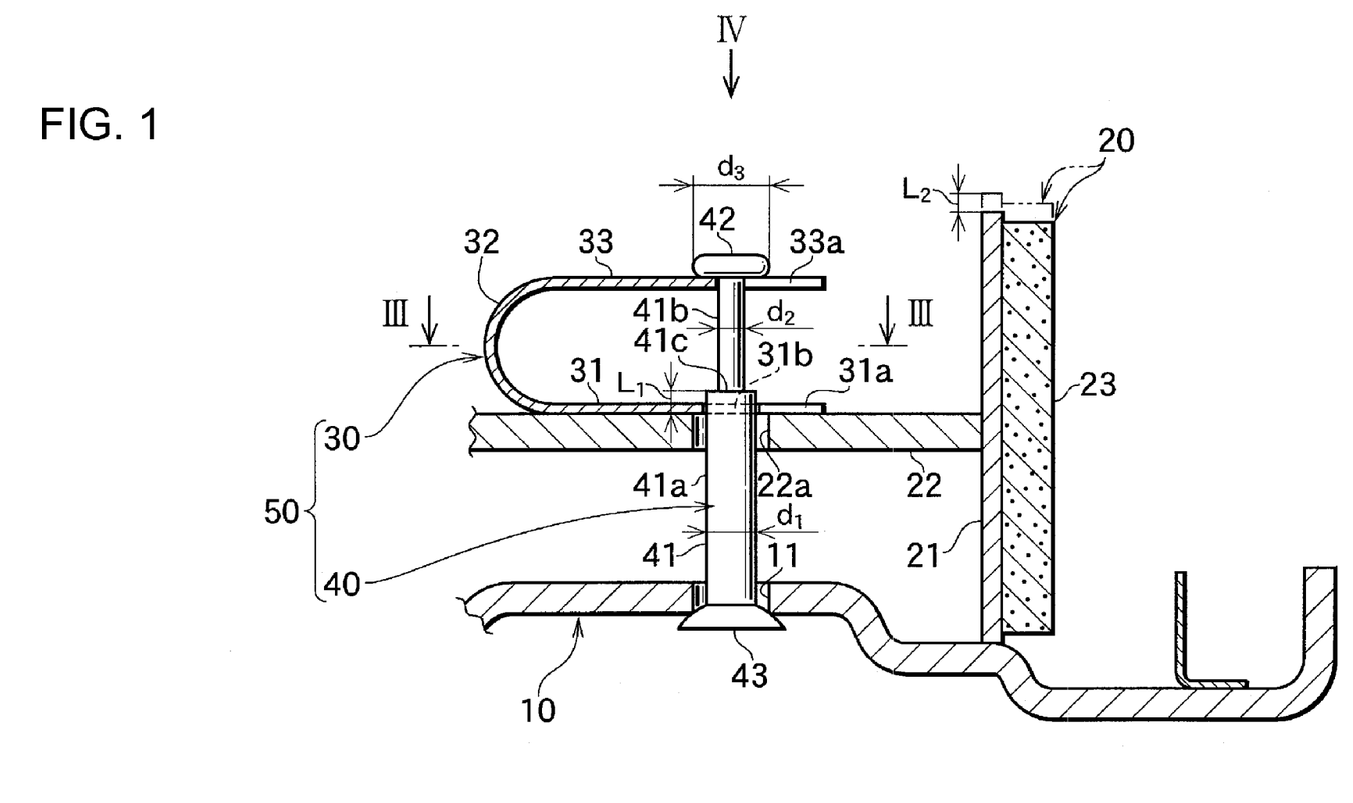
FIG. 1 is a cross section view of the shoe-hold apparatus for the drum brake device according to the first embodiment of the present invention.
Figure 2:
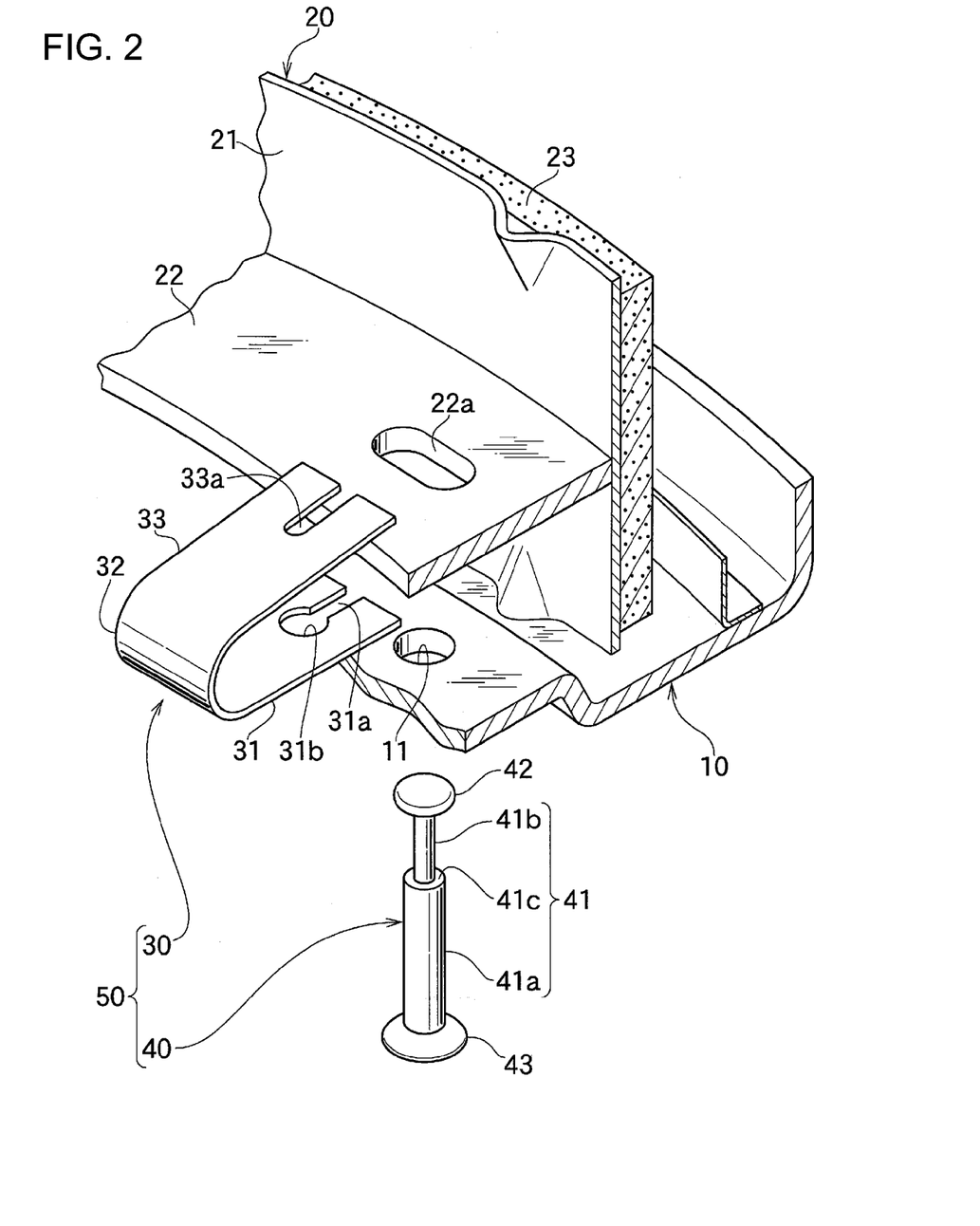
FIG. 2 is a partially omitted broken perspective view of the shoe-hold apparatus according to the first embodiment of the present invention.

FIG. 1 is a cross section view of the shoe-hold apparatus 50 resiliently holding the brake shoe 20 on the back plate 10, and FIG. 2 is a partially omitted broken perspective view of the shoe-hold apparatus 50.

The shoe-hold apparatus 50 is comprised of the shoe-hold spring 30 and the shoe-hold pin 40, which resiliently holds a brake shoe 20 that is slideably arranged on the back plate 10 functioning as a stationary member.

As shown in FIG. 2, the brake shoe 20 is comprised of a rim 21, a web 22, and a lining 23. The rim 21 and the web 22 are fixed in a T-shaped cross-section and a lining 23 is affixed on the surface of the rim 21.

A pin-insertion hole 22a is formed in the web 22, and the pin-insertion hole 22a and the pin-insertion hole 11 of the back plate 10 are arranged in a column so that the shoe-hold pin 40 can pass through the pin-insertion hole 22a of the web 22 via the pin-insertion hole 11 formed in the back plate 10.

The shoe-hold pin 40 is comprised of a cylindrical shaft 41, a disk like head 42 functioning as a second head that is formed by expanding one end of the shaft 41, and a dish-like flange 43 functioning as a first head that is formed by expanding the other end of the shaft 41.

Then, the head 42 and the shaft 41 are shaped to be able to pass through the pin-insertion hole 11 of the back plate 10 and the pin-insertion hole 22a of the web 22, and the flange 43 is shaped to be unable to pass through the pin-insertion hole 11 of the back plate 10.

The shaft 41 is comprised of a large diameter portion 41a, which is formed at a flange 43 side and functions as a disengagement preventive portion, a small diameter portion 41b, which is formed at the head 42 side and functions as a penetrating portion designed to have smaller diameter than the large diameter portion 41a, and a shoulder 41c that is formed at a border between both portions 41a and 41b.

Also, the shoulder 41c may be a tapered surface.

The small diameter portion 41b is a portion that enables the assembly of the shoe-hold spring 30 by pressing the shoe-hold spring 30, which is temporarily mounted on the shoe-hold pin 40 while both ends of the shoe-hold spring 30 are urged to be compressed, from a crossing direction with the axis of the shoe-hold pin, and therefore the small diameter portion 41b is designed to have the same diameter evenly along the axle thereof.

Also, a longitudinal length of the large diameter portion 41a, when the shoe-hold pin 40 is inserted in the brake through the pin-insertion hole 11 of the back plate, is appropriate if the shoulder 41c penetrates the web 22 and sufficiently projects at the drum side.

In detail, the amount of the large diameter portion 41a projecting from the drum side surface of the web 22 is appropriate if a web side arm 31 of the later described shoe-hold spring does not disengage even if the brake shoe 20 is moved upward.

Figure 3:
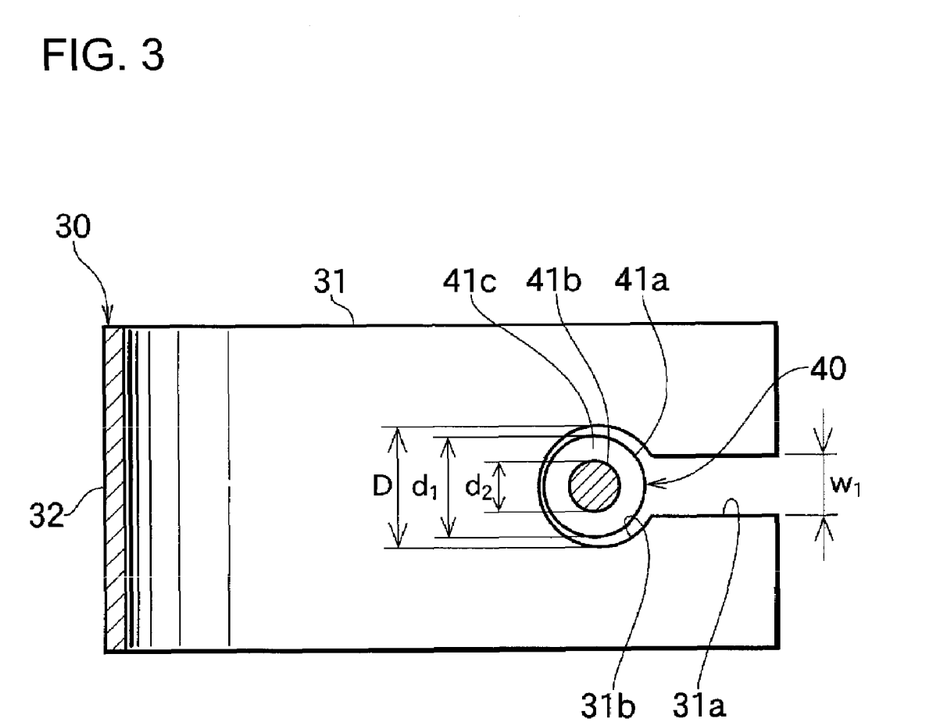
FIG. 3 is a cross section view of FIG. 1 taken along the line III-III.

To explain about the shoe-hold spring 30 as exemplified in FIGS. 2 and 3, the shoe-hold spring 30 is one sheet metal bent to form an almost U shape and is comprised of the web side arm 31 that functions as a first arm, a connecting portion 32 that is a continuous portion from the web side arm 31 and is formed by curving to make an arc shape, a drum side arm 33 that is a continuous portion from the connecting portion 32 and functions as a second arm facing the web side arm 31, in which the web side arm 31 is positioned on the surface of the web 22, and the drum side arm 33 engages with the head 42.

One end opened slot 31a is formed in the web side arm 31 at a central region thereof, and the large diameter pin-insertion hole 31b functioning as a pin-insertion portion, which is larger than a width of the slot 31a, is continuously formed at a closed end portion of the slot 31a.

The slot 31a is designed such that the small diameter portion 41b of the shoe-hold pin is passable therethrough and the large diameter portion 41a is not passable therethrough.

A slot 33a, which denies the head 42 of the shoe-hold pin and the large diameter portion 41a from passing therethrough but allows the small diameter portion 41b to pass therethrough, is formed in the drum side arm 33.

A relative relation with respect to the size of the shoe-hold spring 30 and the shoe-hold pin 40 will be explained next.

In the following descriptions, as shown in FIG. 3, a width of the slot 31a of the web side arm is $W_1$; a width of the slot 33a of the drum side arm is $W_2$; a diameter of the pin-insertion hole 31b is D; a diameter of the large diameter portion 41a of the shoe-hold pin is $d_1$; a diameter of the small diameter portion 41b is $d_2$; and as shown in FIG. 1, a diameter of the head 42 is $d_3$.

The width $W_1$ of the slot 31a of the web side arm is designed to be consistent with the relational expression of $d_2 < W_1 < d_1 < D$ as shown in FIG. 3.

The reason for establishing this dimensional relationship is because the small diameter portion 41b of the shoe-hold pin needs to be positioned between the drum side arm 33 and the web side arm 31 and because the large diameter portion 41a positioned in the pin-insertion hole 31b, after completion of the assembly of the shoe the spring 30, needs to be non-passable through the slot 31a of the web side arm so as to prevent the disengagement of the shoe-hold spring 30.

It is desirable that the difference between the diameter D of the pin-insertion hole 31b of the above-mentioned web side arm and the diameter $d_1$ of the large diameter portion 41a is minimized because the difference may be a factor for increasing the amount of the movement of the web side arm 31 relative to the large diameter portion 41a comparing to the dimensional difference.

Figure 4:
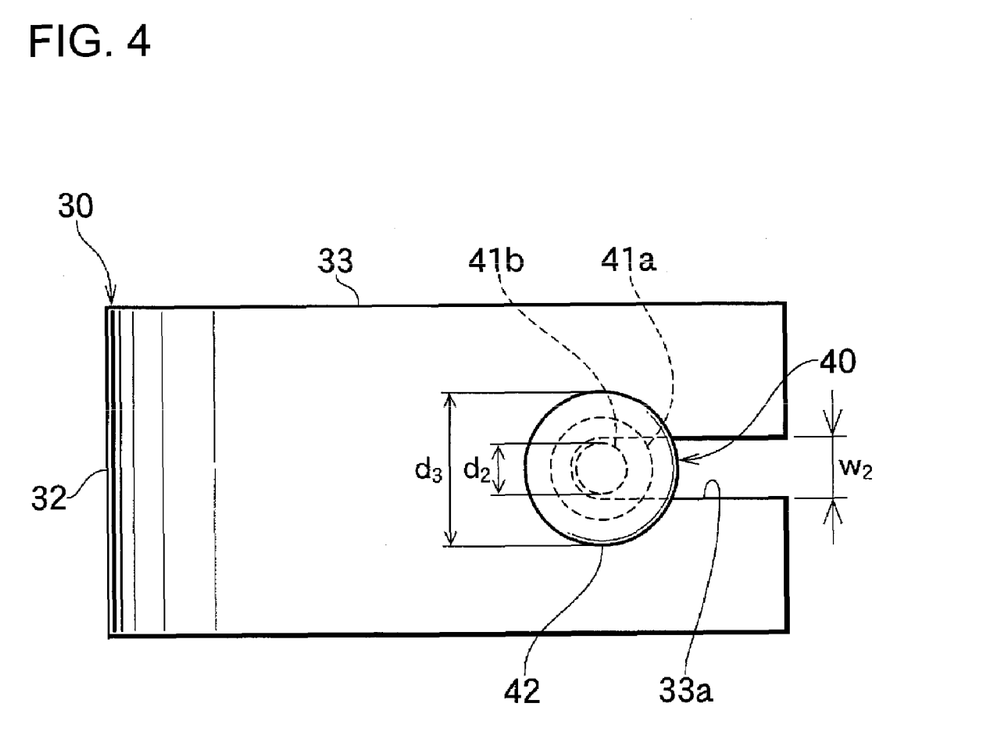
FIG. 4 is a fragmentary view of IV of FIG. 1.

The width $W_2$ of the slot 33a of the drum side arm is designed to be consistent with the relational expression of $d_2 < W_2 < d_3$ as seen in FIG. 4.

As described above, the amount of the large diameter portion 41a of the shoe-hold pin projecting from the drum side surface of the web 22 is appropriate if the web side arm 31 of the shoe-hold spring does not disengage even if the brake shoe 20 is moved upward.

More concretely, under the condition after assembling the shoe-hold spring 30, if the length of the large diameter portion 41a projecting from the drum side surface of the web 22 is $L_1$ and the amount of the brake shoe 20 moving upward against a resilient retaining force of the shoe-hold spring 30 is $L_2$, the relational expression is designed to be $L_2 < L_1$ as shown in FIG. 1.

The present invention, as described later, enables the pair of arms 31 and 33 to be engaged with the web 22 and the head 42 of the shoe-hold pin simply by pressing the shoe-hold spring 30, which is temporarily mounted on the shoe-hold pin 40 while both ends thereof are urged to be compressed, in one direction against the small diameter portion 41b of the shoe-hold pin In other words, the shoe-hold spring 30 can resiliently be retained between the web 22 and the head 42 of the shoe-hold pin.

The shoe-hold spring 30, which is retained by the aforementioned method, is designed such that the difference between the width of the slot 31a of the web side arm and the diameter of the large diameter portion 41a of the shoe-hold pin that is inserted in the pin-insertion hole 31b surely prevents the shoe-hold spring 30 from disengaging.

Also, the present invention, as described later, enables the web side arm 31 and the drum side arm 33 to be engaged with the shoulder 41c and the head 42 of the shoe-hold pin respectively simply by pressing the shoe-hold spring 30, while both ends thereof being urged to be compressed, in one direction against the small diameter portion 41b of the shoe-hold pin.

In other words, the shoe-hold spring 30 can temporarily be mounted on the small diameter portion 41b of the shoe-hold pin, and therefore the assemblability of the shoe-hold apparatus 50 can remarkably be improved.

<Advantages>

A method of assembling the shoe-hold apparatus 50 will be explained next according to FIGS. 5 and 6.

The shoe-hold pin 40, which is inserted in the brake through the pin-insertion hole 11 of the back plate, is inserted in the pin-insertion hole 22a formed in the web 22 of the brake shoe, and the head 42, the small diameter portion 41b, and a part of the large diameter portion 41a project from the drum side surface of the web 22.

Next, the shoe-hold spring 30 is compressed to urge the pair of the arms 31 and 33 to approach toward each other while the web side arm 31 is facing the surface of the web 22 of the brake shoe.

The shoe-hold spring 30 is pressed from a crossing direction with an axis of the shoe-hold pin while the shoe-hold spring 30 being compressed so that the small diameter portion 41b of the shoe-hold pin can pass through the slots 31a, 33a formed in the pair of the arms 31 and 33.

Figure 5:
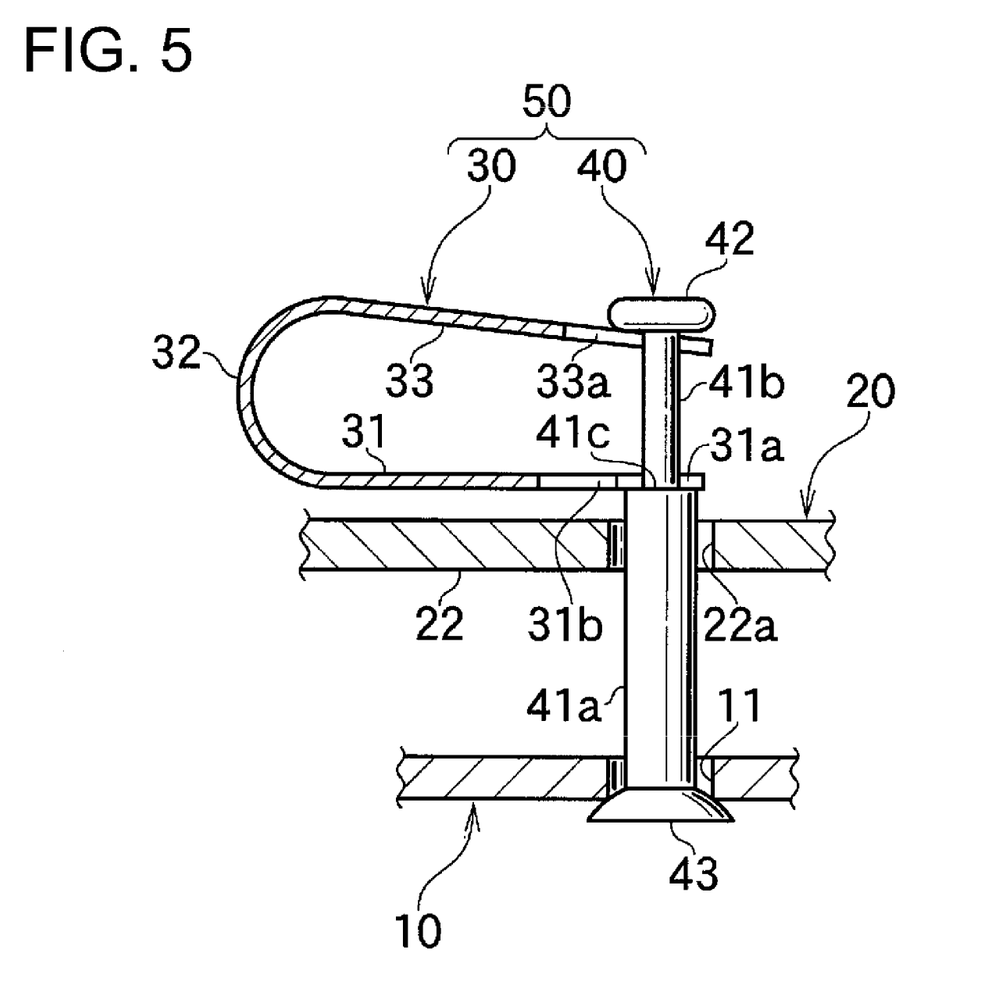
FIG. 5 is an explanation view of the assembly of the shoe-hold apparatus according to the first embodiment of the present invention and is a cross section view of the shoe-hold apparatus at the initial stage of assembling the shoe-hold spring.

If the force compressing the shoe-hold spring 30 is released when the small diameter portion 41b of the shoe-hold pin sufficiently engages with the pair of slots 31a and 33a, then the drum side arm 33 abuts against the head 42 due to the reserved spring force, the web side arm 31 abuts against the shoulder 41c, and the shoe-hold spring 30 is resiliently retained at the small diameter portion 41b as shown in FIG. 5.

Assembling the shoe-hold apparatus 50 after resiliently retaining the pair of arms 31 and 33 at the small diameter portion 41b of the shoe-hold pin will be explained next.

Figure 6:
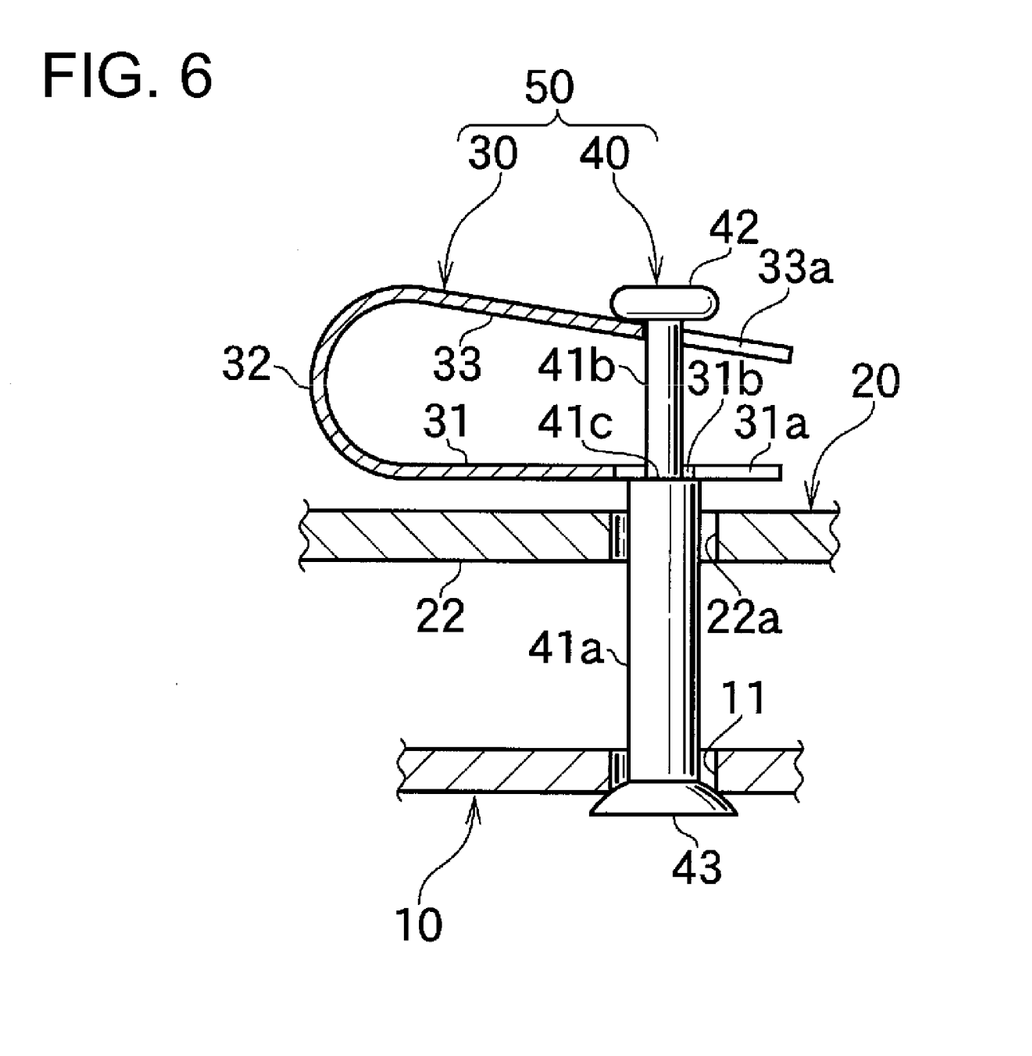
FIG. 6 is an explanation view of the assembly of the shoe-hold apparatus according to the first embodiment of the present invention and is a cross section view when the shoe-hold apparatus reaches to the pin-insertion hole of the shoe-hold spring.

By further pressing the shoe-hold spring 30, as the small diameter portion 41b of the shoe-hold pin moves in a direction from the opening side of the slot 31a of the web side arm to the large diameter pin-insertion hole 31b, a portion abutting to support the web side arm 31, i.e., the shoulder 41c, does not support the web side arm 31 as shown in FIG. 6, and therefore, the preserved spring force resiliently contacts the web side arm 31 with the surface of the web 22 by resiliently being deformed in a direction to depart from the drum side arm 33.

At that time, the large diameter shaft 41 of the shoe-hold pin instantly inserts in the pin-insertion hole 31b formed in the web side arm 31.

Finally, the spring force of the shoe-hold spring 30 is maintained between the back plate 10, on which the flange 43 of the shoe-hold pin is engaged, and the head 42 of the shoe-hold pin, so that the brake shoe 20 can resiliently be retained relative to the back plate 10 as shown in FIG. 1.

As such, the present invention is such that the shoe-hold spring 30 may be compressed to be positioned between the head 42 of the shoe-hold pin and the surface of the web 22 (surface of the drum side) by moving the shoe-hold spring 30 with the pair of compressed arms 31 and 33 from a crossing direction with an axis of the shoe-hold pin relative to the small diameter portion 41b of the shoe-hold pin 40.

The shoe-hold apparatus 50 after completion of assembly of the same is designed to have the dimensional relationship that the large diameter portion 41a insertion in the pin-insertion hole 31b of the web side arm is not able to pass through the slot 31a formed in the web side arm 31, thereby eliminating a chance of disengagement of the web side arm 31 from the large diameter portion 41a.

Also, the longitudinal size of the large diameter portion 41a, for example, is designed to securely maintain the connection thereof even if the shoe-hold spring 30 is deflected as the brake shoe 20 moves up.

Second Embodiment

Figure 7:
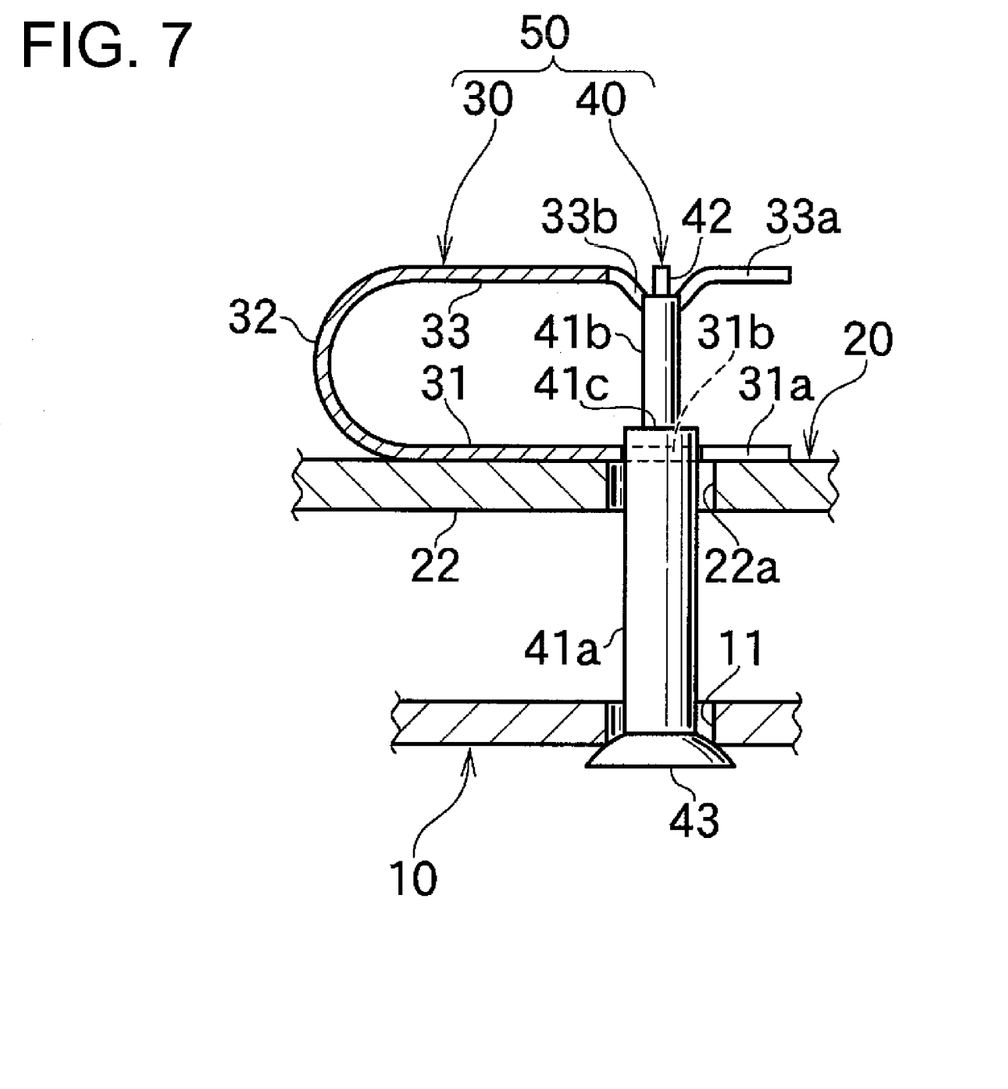
FIG. 7 is a cross section view of the shoe-hold apparatus for the drum brake device according to the second embodiment of the present invention.
Figure 8:
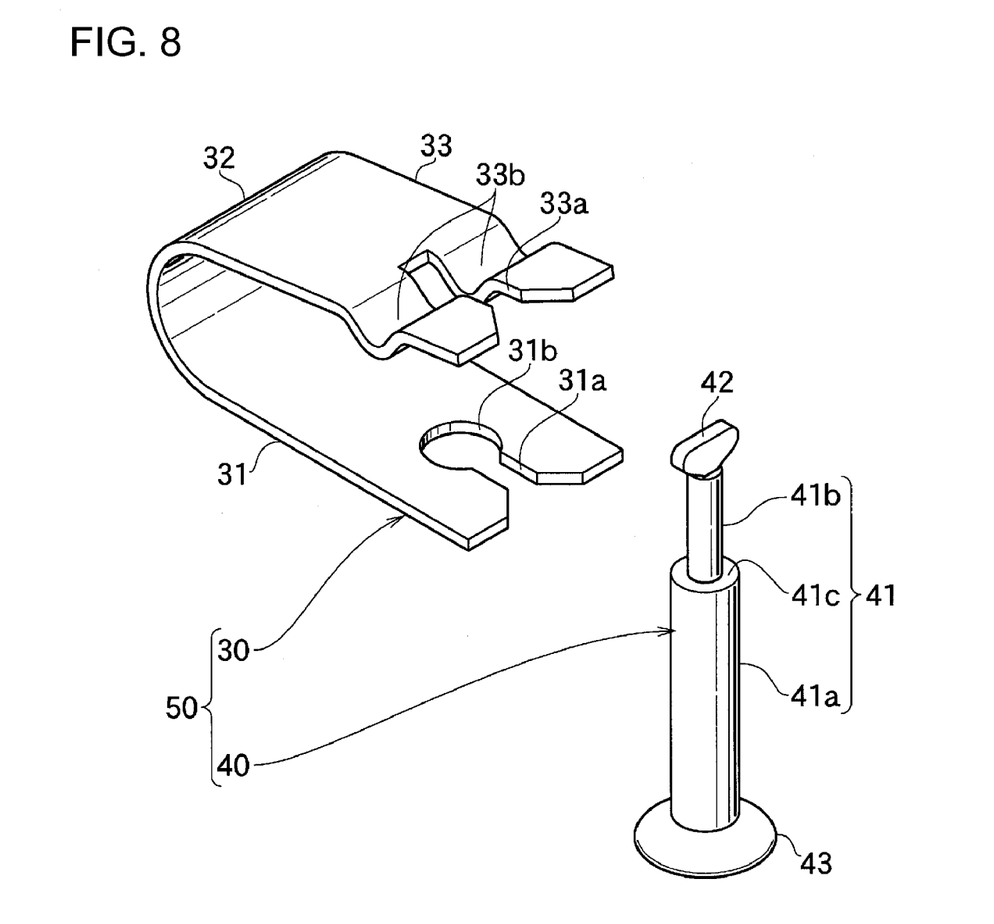
FIG. 8 is a broken perspective view of the shoe-hold apparatus according to the second embodiment of the present invention and is a view illustrating the shoe-hold pin and the shoe-hold spring only.
Figure 9:
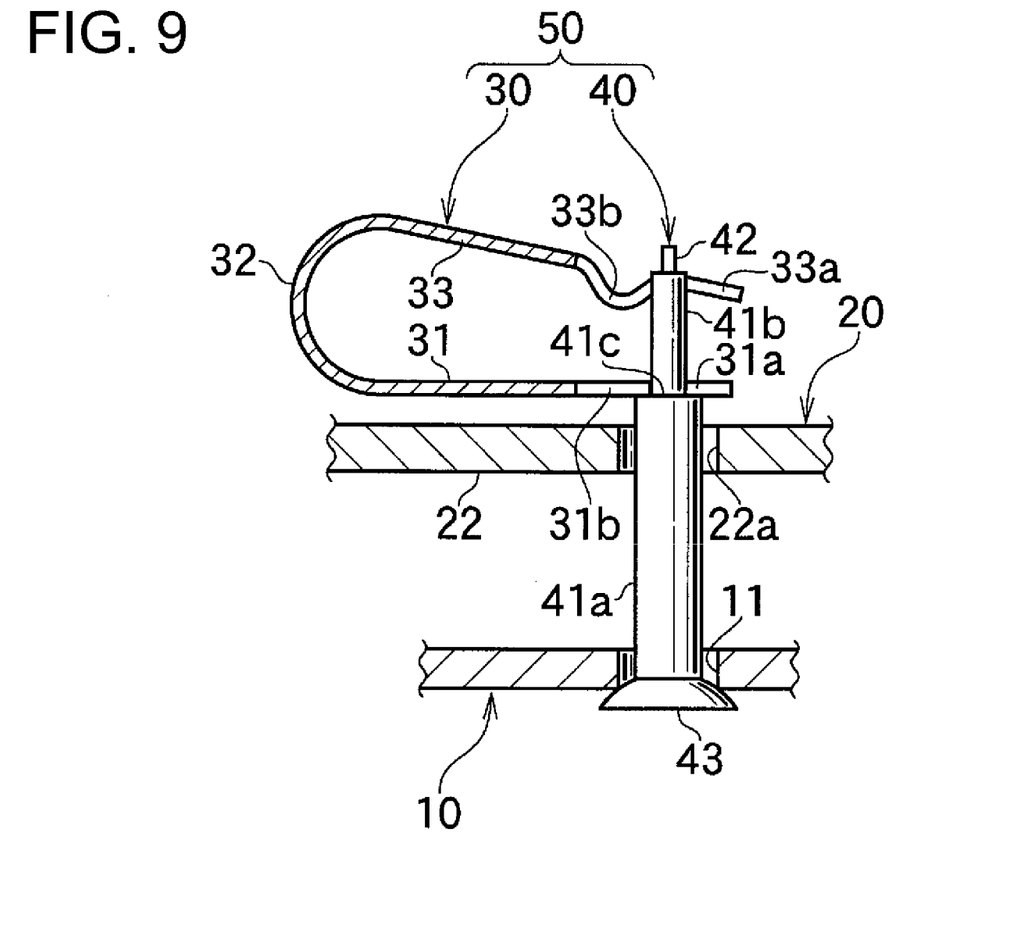
FIG. 9 is an explanation view of the assembly of the shoe-hold apparatus according to the second embodiment of the present invention and is a cross section view of the shoe-hold apparatus at the initial stage of assembling the shoe-hold spring.

Another embodiment relating to the shoe-hold apparatus 50 is illustrated in FIGS. 7-9.

As shown in FIG. 8, the shoe-hold apparatus 50 of this example is comprised of the shoe-hold spring 30 having a seat 33b with a groove that is formed by curving a sheet surface around the central region of the drum side arm 33 with the slot 33a toward the web side arm 31 and the shoe-hold pin 40 having the flattened semicircle head 42 at a top of the small diameter portion 41b.

One end opened slot 33a, which denies the head 42 of the shoe-hold pin and the large diameter portion 41a from passing therethrough but allows the small diameter portion 41b to pass therethrough, is formed in the drum side arm 33 of the shoe-hold spring in this example.

Assembling the shoe-hold apparatus 50 will be explained with reference to FIGS. 7 and 9.

The process is the same as in the first embodiment until resiliently retaining the pair of arms 31 and 33 at the small diameter portion 41b of the shoe-hold pin and therefore the rest of the process of assembling the shoe-hold apparatus 50 will be explained next.

In order to reach the small diameter portion 41b of the shoe-hold pin at the closed end portion of the slots 31a and 33a that are formed at the pair of arms 31 and 33, as the small diameter portion 41b of the shoe-hold pin moves in the direction of the large diameter pin-insertion hole 31b from the opening side of the slot 31a of the web side arm by pressing the shoe-hold spring 30, the preserved spring force resiliently deforms the web side arm 31 and drum side arm 33 in the direction to depart from each other because the portion abutting against and supporting the web side arm 31, i.e., the shoulder 41c, and the portion abutting against and supporting the drum side arm 33, i.e., the portion from the top of the drum side arm 33 to the seat 33b, do not support both arms 31 and 33 as shown in FIG. 9.

Accordingly, the head 42 that is wider than the small diameter portion 41b engages with the seat 33b of the drum side arm to determine the position, and the web side arm 31 resiliently contacts the surface of the web 22.

At that time, the large diameter portion 41a of the shoe-hold pin instantly inserts in the pin-insertion hole 31b formed in the web side arm 31.

Finally, the spring force of the shoe-hold spring 30 is maintained between the back plate 10, on which the flange 43 of the shoe-hold pin is engaged, and the head 42 of the shoe-hold pin, and therefore the brake shoe 20 can resiliently be retained relative to the back plate 10 as shown in FIG. 7.

According to this embodiment, a conventionally and widely used flattened head may be used in the shoe-hold pin 40, and therefore manufacturing the shoe-hold pin 40 is simple.

As shown in FIG. 8, the width of the groove at the entrance side of the slots 31a, 33a formed in the pair of the arms 31 and 33 may be widened to add a guiding function to improve the operability of insertion the shoe-hold pin 40.

For better understanding of the present invention, the above-described embodiments use the shoe-hold pin with a circular shape in a cross section; however, any other shapes such as a polygonal shape in cross section may be applied as long as there are the portion functioning as the small diameter portion where the shoe-hold spring is assembled first and the portion functioning as the large diameter portion, which prevents the shoe-hold spring from disengaging after completion of the assembly of the shoe-hold pin and the shoe-hold spring.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A shoe-hold apparatus for a drum brake device, comprising:

(1) a shoe-hold spring including
  a first arm or a web side arm arranged on a drum side surface of a web of a brake shoe, which is mounted on a back plate at an opposite side of the back plate,
  a second arm or a drum side arm arranged to face the first arm, and
  a curved connecting portion jointing the first and second arms, the first arm has a one end opened first slot and said second arm has a one end opened second slot at their ends respectively; and (2) a shoe-hold pin including a first head that is non-passable through a pin-insertion hole formed in the back plate,
  a shaft continuing from the first head and passable through the pin-insertion hole, and
  a second head continuing from the shaft and passable through the pin-insertion hole,
  said shoe-hold spring is resiliently retained between the second head and the web by penetrating the second head and shaft through the pin-insertion hole of the back plate to engage the first head with the back plate and sliding the shoe-hold spring on the drum side surface of the web from a crossing direction with an axis of the shoe-hold pin while the second head and a part of the shaft are projecting from the drum side surface of the web so that the shoe-hold pin can be passed through the pair of said first and second slots, wherein said shoe-hold spring has a pin-insertion portion continuing from said first slot in said first arm and said shaft of the shoe-hold pin has (1) a penetrating portion that is passable through said first and second slots and (2) a disengagement preventive portion that is non-passable through said first slot of the first arm and is configured so that a predetermined portion thereof is allowed to be positioned in said pin insertion portion, said disengagement preventive portion has a length that is projected from said drum side surface of the web mounted on the back plate while said shoe-hold pin is engaging with said back plate; and said length that is projected from said drum side surface of the web is determined so as to restrict a lateral movement of the shoe-hold spring along said web and a rotational movement of the shoe-hold spring with said second head as the fulcrum when said disengagement preventive portion of the shoe-hold pin is positioned within the pin-insertion portion of the first arm.

2. The shoe-hold apparatus according to claim 1, wherein said shoe-hold pin is such that said first arm of the shoe-hold spring is temporarily mountable on a border between said penetrating portion and said disengagement preventive portion.

* * * * *